Figure 1:
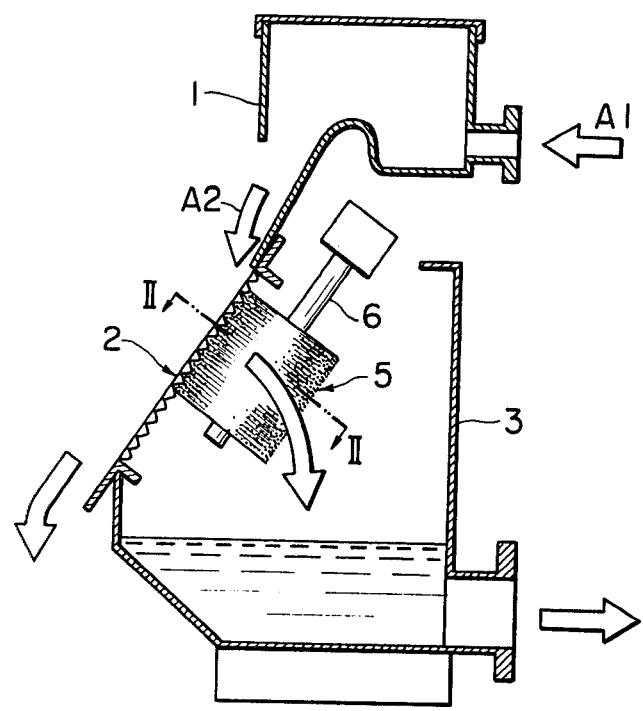

United States Patent [19]

Ando et al.

[11] 4,287,064
[45] Sep. 1, 1981

[54] BRUSH DRIVING APPARATUS FOR A SOLID-LIQUID SEPARATION SCREEN

[75] Inventors: Seiya Ando, Mitaka; Kozi Inoue, Osaka, both of Japan

[73] Assignee: Kabushiki Kaisha Ando Screen Seisakujo, Japan

[21] Appl. No.: 156,575

[22] Filed: Jun. 5, 1980

[30] Foreign Application Priority Data

Jun. 11, 1979 [JP] Japan .................................. 54-73198

[51] Int. Cl.³ ............................................. B07B 1/52
[52] U.S. Cl. .................................. 210/413; 209/388; 209/390
[58] Field of Search ............... 210/408, 413–415, 210/298, 332; 209/386, 388, 390; 15/256.52, 256.53

[56] References Cited

U.S. PATENT DOCUMENTS

| 175,286 | 3/1876 | Hollingsworth | 209/390 X |
|---|---|---|---|
| 240,163 | 4/1881 | Dorsey et al. | 209/390 |
| 319,763 | 6/1885 | Wegman, Jr. | 209/390 |
| 532,068 | 1/1895 | Jacobus | 209/390 |
| 1,684,305 | 9/1928 | Brackett | 209/390 X |
| 1,910,803 | 5/1933 | Leonard | 210/413 X |

FOREIGN PATENT DOCUMENTS 428919  9/1911  France ............................. 210/413

*Primary Examiner*—William A. Cuchlinski, Jr.
*Attorney, Agent, or Firm*—Price, Heneveld, Huizenga & Cooper

[57] ABSTRACT

On a liquid separation side of a screen is provided a rotary brush, pinions on the shaft of said rotary brush at its opposite ends are respectively meshed with stationary racks so that the brush may be rotated while it is moving in the horizontal direction, a fork provided at the extremity of the shaft of the brush is engaged with a roller on a double chain which is laid about its driving sprocket and a driven sprocket, and thereby the length of movement of the brush can be extended by merely elongating the double chain.

4 Claims, 5 Drawing Figures

BRUSH DRIVING APPARATUS FOR A SOLID-LIQUID SEPARATION SCREEN

The present invention relates to a brush driving apparatus for a solid-liquid separation screen.

Heretofore, it has been known that when a screen is disposed in an inclined state under a feed box and a solid-liquid mixture to be separated is fed from the feed box over the screen, large granules of the solid flow successively along the upper surface of the screen while the liquid and small granules of the solid pass through the screen and flow downwardly, but if the screen is disposed with its wires directed in the horizontal direction, solid materials would block the meshes of the screen resulting in lowering of a separation efficiency, and hence, in order to remove the solid materials blocking the meshes of the screen, a rotary brush is provided under the screen.

However, in the prior art there was not an efficient brush driving apparatus for a solid-liquid separation screen, which can reciprocate a rotary brush in the horizontal direction over any given length while driving the rotary brush into rotation.

Therefore, it is one object of the present invention to provide a brush driving apparatus for a solid-liquid separation screen, which drives a rotary brush into rotation while reciprocating it in the horizontal direction so that the rotary brush may remove solid materials blocking meshes of the screen.

Another object of the present invention is to provide a brush driving apparatus for a solid-liquid separation screen, which can elongate the distance of the reciprocating motion of the rotary brush even if the width of the screen in the horizontal direction should be extended, and which can adjust the distance of the reciprocating motion.

According to one feature of the present invention, there is provided a brush driving apparatus for a solid-liquid separation screen which consists of a large number of wires arranged in parallel to each other in the horizontal direction so that the surface of said screen may be inclined, characterized in that on the separated liquid side of said screen is provided a rotary brush whose shaft is directed in parallel to said screen surface and at right angles to said wires so that tip ends of wire elements of said brush may be admitted in the slits between said wires of the screen, pinions mounted on the shaft of said rotary brush at its opposite ends are meshed with fixed racks, furthermore a fork provided at the extremity of the shaft of said brush is engaged with a roller on a double chain which is laid about its driving sprocket and a driven sprocket, and said driven sprocket is supported by a movable bearing.

Figure 2:
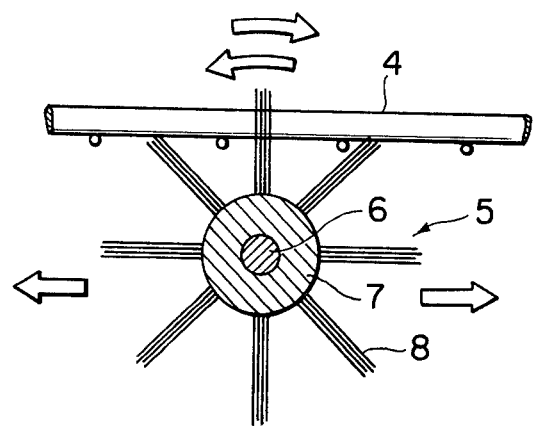
Figure 3:
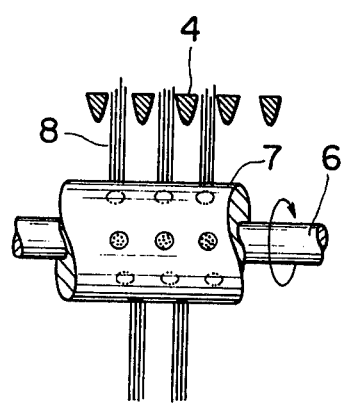
Figure 4:
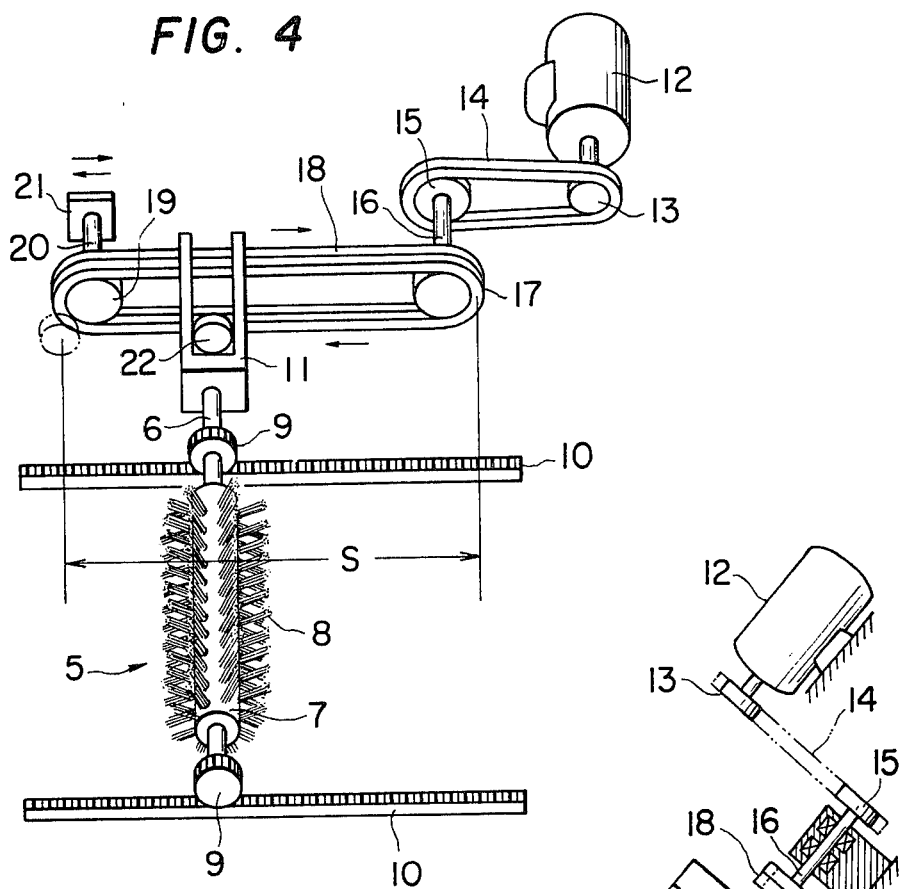
Figure 5:
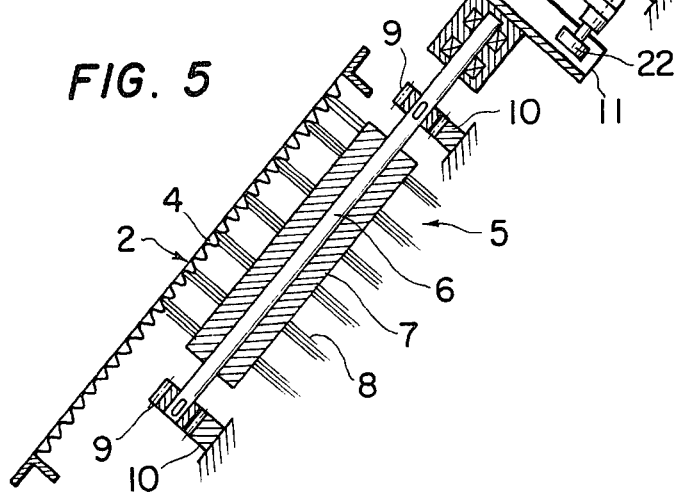

Above-mentioned and other features and objects of the present invention will become more apparent by reference to the following description of its preferred embodiment taken in conjunction with the accompanying drawings, wherein FIG. 1 is a cross-sectional front view of a screening apparatus, FIG. 2 is a partial cross-section view of the apparatus shown in FIG. 1 taken along line II—II, FIG. 3 is an enlarged front view of a part of the apparatus shown in FIG. 1, FIG. 4 is a perspective view of a driving apparatus for a rotary brush, and FIG. 5 is a front view of the same driving apparatus.

Now one preferred embodiment of the present invention will be described in greater detail with reference to FIGS. 1 through 5.

Referring to these figures, a screen 2 is disposed in an inclined state under a feed box 1. When a raw material liquid is fed from the feed box 1 onto the screen 2 as shown by an arrow A2, large granules of solid will flow along the upper surface of the screen 2, whereas water and small granules of solid will pass through the screen 2 and will flow downwards to the lower section of a screen box 3. The screen 2 consists of a large number of wires 4 arranged in parallel to each other in the horizontal direction with slits provided between adjacent wires 4.

On the separated liquid side of the screen 2 is provided a rotary brush 5 with its shaft 6 directed in parallel to the surface of the screen 2 and at right angles to the wires 4, a drum 7 being fixedly secured to the shaft 6, and wire elements 8 are implanted on the circumferential surface of the drum 7 so that the tip ends of the wire elements may be admitted in the slits between the wires 4 of the screen 2. Pinions 9 fixedly secured to the opposite ends of the shaft 6 are respectively meshed with fixed racks 10, and a fork 11 is rotatably mounted on the upper end of the shaft 6.

A sprocket 13 of a motor is coupled to a sprocket 15 of a driving shaft 16 via a single chain 14, and a double chain 18 is laid around a sprocket 17 at the other end of the driving shaft 16 and a sprocket 19 on a driven shaft 20. The driven shaft 20 having the sprocket 19 is supported by a bearing 21 which is provided in a movable manner. A roller 22 is pivotally supported by the double chain 18, and it is placed between the two yorks of the fork 11.

Describing now the mode of operation of the brush driving apparatus according to the present invention, when a solid-liquid mixture to be separated is made to flow from the feed box 1 onto the screen 2, large granules of solid successively flow along the upper surface of the screen 2, whereas liquid and small granules of solid pass through the screen 2 and flow donwardly.

On the other hand, when the motor 12 is actuated, the driving shaft 16 is driven into rotation via the sprocket 13, single chain 14 and sprocket 15, and accordingly the double chain 18 laid around the sprocket 17 and the driven sprocket 19 is made to turn.

Since the roller 22 that is pivotally supported by the double chain 18 is placed between the two yorks of the fork 11, the shaft 6 reciprocates through a brush stroke S in accordance with the reciprocating movement of the roller 22.

In addition, since the pinions 9 mesh with the fixed racks 10, the shaft 6 in itself while it is reciprocating. Hence, the drum 7 moves in the horizontal direction while it is rotating, and it serves to remove solid materials staying in the slits between the wires 4 by means of the wire elements 8. In case where the brush stroke is variable among a number of stroke values such as, for instance, 1220 mm, 1520 mm, 1820 mm, etc., then it is only necessary to displace the movable bearing 21 to an appropriate position and to replace the double chain 18 by an appropriate one.

As described in detail above, according to the present invention, since the slits in the screen 2 can be cleaned by means of a rotary brush which moves across the screen while it is rotating, blocking of meshes of a screen can be efficiently prevented.

Moreover, the brush stroke S can be increased by elongating the double chain 18, and the driving apparatus can be easily adapted to different brush strokes S by merely replacing the double chain 18. In addition, since the roller 22 is mounted on the double chain 18, support of the roller 22 can be achieved reliably.

What is claimed is:

1. A means for cleaning a liquid-solid separation screen having a plurality of parallel wires, a brush having elements capable of passing between said wires to remove solids lodged therein; a shaft mounting said brush and means supporting said shaft for reciprocal movement lengthwise of said wires; said means including elements at opposite ends of said brush rotatably supporting said shaft for reciprocal movement in a single plane parallel with said screen, said elements including a roller on said shaft and an elongated support member therefor, said roller making positive rolling engagement with said support member for rotating said shaft and brush as the same moves lengthwise of said wires and support member; an endless member and a pair of pulleys supporting the same for continuous movement in one direction with advance and return runs parallel with said wires; drive means mounted on and projecting from one side of said endless member; a motion transmitting member mounted on said shaft and engaging said drive means; said drive means having sliding engagement with said motion transmitting member toward and away from said screen whereby said drive means remains in constant driving engagement with said shaft; means for powering said endless member to reciprocate said shaft back and forth the length of said screen while alternately rotating said brush in opposite directions.

2. A means for cleaning a liquid-solid separation screen as described in claim 1 wherein said roller is a pinion gear and said support member is a rack.

3. A means for cleaning a liquid-solid separation screen having a plurality of parallel wires, a brush having elements capable of passing between said wires to remove any solids lodged therein; a shaft mounting said brush and means supporting said shaft for reciprocal movement lengthwise of said wires; means at opposite ends of said brush rotatably supporting said shaft for reciprocal movement in a single plane parallel with said screen, said support means at one end of said brush including a roller on said shaft and an elongated support member thereof, said roller making positive rolling engagement with support member for rotating said shaft and brush as the same moves lengthwise of said wires; an endless member and a pair of pulleys supporting the same for continuous movement in one direction with advance and return runs and means for driving said endless member; a two element motion translating means connecting said endless member to said shaft, one element thereof mounted on said shaft and the other on said endless members for constantly reciprocating said shaft in response to the travel of said endless member;

4. A means for cleaning a liquid-solid separation screen as described in claim 3 wherein said other element projects from said endless member and said one element is a fork having a pair of spaced sides defining a slot therebetween of a width to slidably receive said projecting element therebetween, said sides being long enough to maintain engagement of said projecting element throughout its entire path of travel.

* * * * *

UNITED STATES PATENT AND TRADEMARK OFFICE
CERTIFICATE OF CORRECTION

PATENT NO. : 4 287 064
DATED : September 1, 1981
INVENTOR(S) : Seiya Ando and Kozi Inoue It is certified that error appears in the above—identified patent and that said Letters Patent is hereby corrected as shown below:

Column 2, line 42:

"donwardly" should be --downwardly--

Column 2, line 54:

After "itself" add -rotates--

Column 4, line 16:

"thereof" should be --therefor--

Column 4, line 26: after "member;"

Add --means for constantly driving said endless member in one direction.--

Signed and Sealed this

Second Day of March 1982

[SEAL]

Attest:

Attesting Officer

GERALD J. MOSSINGHOFF
Commissioner of Patents and Trademarks